UNITED STATES PATENT OFFICE 2,613,172

X-RAY CONTRAST COMPOSITIONS

William Galler, Valley Stream, N. Y., assignor to American Cystoscope Makers, Inc., New York, N. Y., a corporation of New York No Drawing. Application August 10, 1949, Serial No. 109,630

7 Claims. (Cl. 167—95)

This application relates to X-ray contrast compositions.

Water insoluble X-ray contrast agents have been heretofore proposed for use in delineating structures of the animal body as well as human, and also in delineating structural details in inanimate objects, such as defects in metals, by impregnating or filling or enclosing the structures with the contrast agent and then taking appropriate X-ray photographs. These compositions are unstable and release free iodine which is objectionable in the treatment of tubercular patients, for example. Again, because of the unstability of these compositions, they cannot be sterilized without material decomposition. Moreover, these compositions have not been too successful because of their highly viscous nature. This lack of fluidity is particularly objectionable in that when these compositions are injected in humans or animals, their slow rate of flow deters wide-spread application. To obviate this difficulty, emulsions have been suggested, but this expedient renders the medium less opaque and materially reduces the effectiveness of the agent as an X-ray contrast composition.

In accordance with this invention, compositions are provided as X-ray contrast mediums which have a markedly greater fluidity than the compositions heretofore employed, which do not release free iodine and which because of their stability can be sterilized before use as well as be capable of storage for prolonged periods of time without deterioration even under adverse temperature conditions. The compositions of this invention comprise a mixture of two or more 2,4,6-triiodophenoxy alkanes. The iodine content of the composition should be between 10 and 75% and preferably between 35 and 45%. Desirably, the mixture of the 2,4,6-triiodophenoxy alkanes is dissolved in a vegetable oil. Although any 2,4,6-triiodophenoxy alkane may be used in the production of the X-ray contrast compositions of this invention, desirably such 2,4,6-triiodophenoxy alkanes have alkyl groups of not more than 18 carbon atoms.

Examples of 2,4,6-triiodophenoxy alkanes are the 2,4,6-triiodophenoxy derivatives of methane, ethane, propane, isopropane, isobutane, tertiary butane, n-hexane, n-octane, decanes, dodecanes, tetradecanes and hexadecanes.

Examples of the vegetable oil are peanut, cottonseed, poppyseed, corn and sunflower seed oils or mixtures of such oils.

A more comprehensive understanding of this invention is obtained by reference to the following examples:

Example 1

27 kilos of 2,4,6-triiodophenoxy isopropane are mixed with 29.2 kilos of 2,4,6-triiodophenoxy n-hexane. To this mixture is added 44 kilos of cottonseed oil. The mixture of oil and 2,4,6-triiodophenoxy alkanes is heated to a temperature of about 50° C. and stored for a period sufficient to liquify the mass. After liquification, about one-half kilo of decolorizing charcoal is added to clarify the solution. The solution is then filtered and filled into suitable containers. The resulting composition has a pale-yellow color, not substantially different from the original cottonseed oil and has a particularly low viscosity.

Example 2

The procedure described in Example 1 is followed except that insead of employing 27 kilos of 2,4,6-triiodophenoxy isopropane 35 kilos of 2,4,6-triiodophenoxy n-tetradecane were used, instead of employing 29.2 kilos of 2,4,6-triiodophenoxy n-hexane 27.7 kilos of 2,4,6-triiodophenoxy n-butane were employed and instead of using 44 kilos of cottonseed oil 37.3 kilos of peanut oil were employed.

Example 3

The procedure described in Example 1 is followed except that instead of using 27 kilos of 2,4,6-triiodophenoxy isopropane 36.6 kilos of 2,4,6-triiodophenoxy n-hexadecane were used, instead of using 29.2 kilos of 2,4,6-triiodophenoxy n-hexane 30.7 kilos of 2,4,6-triiodophenoxy n-octane were used and instead of using 44 kilos of cottonseed oil 32.7 kilos of rape seed oil were used.

2,4,6-triiodophenoxy n-octane, 2,4,6-triiodophenoxy decane, 2,4,6-triiodophenoxy n-tetradecane and 2,4,6-triiodophenoxy n-hexadecane are new compounds. All of these compounds as well as other 2,4,6-triiodophenoxy alkanes may be prepared by the method described in the Journal of the American Chemical Society, vol. 61, page 2666, (1939) except that the appropriate alkyl halide such as n-octyl halide is employed instead of the alkyl halide described in that article.

The terms and expressions which I have employed are used as terms of description and not of limitation and I have no intention in the use of such terms and expressions of excluding any equivalents of the features described or portions thereof but recognize that various modifications are possible within the scope of the invention claimed.

What is claimed is:

1. An X-ray contrast composition comprising a mixture of a plurality of 2,4,6-triiodophenoxy alkanes dissolved in a vegetable oil, the iodine content of said composition being between 10 and 75%.

2. An X-ray contrast composition comprising a mixture of a plurality of 2,4,6-triiodophenoxy alkanes dissolved in a vegetable oil, the iodine content of said composition being between 35 and 45%.

3. An X-ray contrast composition comprising a mixture of a plurality of 2,4,6-triiodophenoxy alkanes in which the alkyl group has not more than 18 carbon atoms dissolved in a vegetable oil, the iodine content of said composition being between 10 and 75%.

4. An X-ray contrast composition comprising a mixture of a plurality of 2,4,6-triiodophenoxy alkanes in which the alkyl group has not more than 18 carbon atoms dissolved in a vegetable oil, the iodine content of said composition being between 35 and 45%.

5. An X-ray contrast composition comprising a mixture of 2,4,6-triiodophenoxy isopropane and 2,4,6-triiodophenoxy n-hexane dissolved in a vegetable oil, the iodine content of said composition being between 10 and 75%.

6. An X-ray contrast composition comprising a mixture of 2,4,6-triiodophenoxy isopropane and 2,4,6-triiodophenoxy n-hexane dissolved in a vegetable oil, the iodine content of said composition being between 35 and 45%.

7. An X-ray contrast composition comprising a mixture of 2,4,6-triiodophenoxy isopropane and 2,4,6-triiodophenoxy n-hexane dissolved in cottonseed oil, the iodine content of said composition being about 40%.

WILLIAM GALLER.

REFERENCES CITED

The following references are of record in the file of this patent:

FOREIGN PATENTS

| Number | Country | Date |
| --- | --- | --- |
| 517,425 | Great Britain | Jan. 30, 1940 |

OTHER REFERENCES

Drew: Journal of the American Chemical Society, volume 61, page 2666 (1939).